116,043

UNITED STATES PATENT OFFICE.

CHARLES H. FRINGS, OF CENTRETON, MISSOURI, ASSIGNOR TO HIMSELF AND CHARLES BRACHES, OF SAME PLACE.

IMPROVEMENT IN FERMENTING MASHES.

Specification forming part of Letters Patent No. 116,043, dated June 20, 1871; antedated June 10, 1871.

*To all whom it may concern:*

Be it known that I, CHARLES H. FRINGS, of Centreton, in the county of St. Louis and State of Missouri, have invented a new and Improved Process of Fermenting Mash; and I do hereby declare that the following is a full, clear, and exact description thereof, which will enable others skilled in the art to make and use the same.

My invention relates to a new process for permeating grain mashes with yeast-forming elements, at the time and in the manner hereinafter described.

The fermentation of grain mashes is fully and rapidly completed only when an excess of yeast-forming matter is present in soluble form. These substances consist of carbohydrates, (sugar, &c.,) albuminoids, (gluten, &c.,) and a variety of mineral salts. All the cereal grains (wheat, rye, oats, barley, and maize,) contain abundantly adequate amounts of all these; but the greater part of the organic compounds present is changed chemically by the influences of the high temperature employed in the mashing process in a manner highly injurious to the formation of yeast, so that but a very small portion of these substances is found in the mash in the soluble condition in which, alongside of the carbohydrates, it is at once available for the formation of yeast. The latter process, in fact, would soon come to an end were it not that, during the progress of fermentation, a part of the liquid cell contents of the effete yeast again becomes available for the purpose. The process of transformation, however, is too slow (even when large amounts of active yeast are introduced at the outset) to allow of the full completion of fermentation in the course of forty-eight hours, as is now required by the law of the United States. It is only when lactic acid is produced in the mash, possessing the power of rendering soluble additional yeast-forming matter, that the fermentation becomes sufficiently rapid; but in this case there is a corresponding diminution of the resulting alcohol.

Of all cereals, corn (maize) requires the highest temperature in mashing; and since, moreover, it contains barely half the amount of mineral matter present in other kinds of grain, it is not strange that, as actually happens, the successful fermentation of corn mashes is much more difficult to accomplish than is the case when other grain is under treatment. It is usual, on this account, to increase the fermentability of corn mashes by the addition of other (unmalted) grain; but even this expedient fails to accomplish fully the end in view.

These elements themselves, with which I propose to overcome this difficulty, are the following: Nitrogen, sulphur, phosphorus, chlorine, potassium, sodium, calcium, and magnesium.

The most suitable compounds of these elements now in commerce, and the proportions of the same to be added to a bushel of corn for a fermentation of two days' duration, are as follows: Nitrate of ammonia, one-fourth ounce; sulphate of magnesia, one-sixteenth ounce; phosphate of soda, one-fourth ounce; carbonate of potash, one-fourth ounce; carbonate of lime, one thirty-second ounce.

For other raw grain, such as wheat, rye, barley, or oats, one-half of the above amounts is sufficient, while malt, used only for the purpose of saccharification, and not heated above 160° Fahrenheit requires no addition at all.

As a matter of course, other salts containing the kind of ingredients in a soluble condition are equally applicable. Thus it is altogether a matter of indifference, qualitatively, whether we use phosphate of ammonia and nitrate of soda, or, as above stated, nitrate of ammonia and phosphate of soda. The selection will sensibly be governed by considerations of the relative cost and purity of the commercial articles.

The *modus operandi* is as follows: So soon as this mash has cooled down to 120° Fahrenheit—say about one-half hour before the addition of the yeast—the salts are added singly, and with constant stirring, no preliminary preparation or solution being necessary. The addition of yeast, also, must be accompanied by a thorough stirring and incorporation, whereupon fermentation not only sets in very rapidly, but is fully completed in the course of forty-eight hours.

Having thus described all that is necessary to a full understanding of my invention, what I esteem to be new, and desire to protect by Letters Patent, is—

The application to a grain mash, at the time and in the manner specified, of salts containing all the yeast-forming elements in a soluble form, as and for the purpose specified.

CHAS. H. FRINGS.

Witnesses:
LOUIS WILLICH,
T. C. HILGARD, M. D.